United States Patent [19]

Miavitz

[11] 4,135,693
[45] Jan. 23, 1979

[54] DOUBLE HOOK HANGER

[76] Inventor: Frederick J. Miavitz, 7040 Shaner Dr., Walton Hills, Ohio 44146

[21] Appl. No.: 793,238

[22] Filed: May 3, 1977

[51] Int. Cl.² ............... F16B 45/00; B42F 13/00
[52] U.S. Cl. .................. 248/339; 24/73 HH; 248/301; 248/304
[58] Field of Search ......... 24/73 HH, 73 HL, 73 HR, 24/230.5 AD; 248/211, 213, 215, 227, 290, 294, 301, 303–308, 317, 318, 322, 339–341

[56] References Cited

U.S. PATENT DOCUMENTS

| 312,105 | 2/1885 | Faivre | 24/73 HH |
|---|---|---|---|
| 369,946 | 9/1887 | Jayne et al. | 248/304 |
| 1,389,538 | 8/1921 | Taylor | 248/341 |
| 1,737,873 | 12/1929 | Bauer | 24/73 HH |
| 1,831,717 | 11/1931 | Muniente | 248/340 |
| 2,320,067 | 5/1943 | Caughren | 24/73 HH X |
| 3,163,389 | 12/1964 | Thornburgh | 248/301 X |
| 3,715,706 | 2/1973 | Michel et al. | 339/156 R |

FOREIGN PATENT DOCUMENTS

| 211495 | 3/1960 | Austria | 248/307 |
|---|---|---|---|
| 945747 | 12/1948 | France | 248/339 |

Primary Examiner—Lawrence J. Staab
Attorney, Agent, or Firm—Wesley B. Taylor

[57] ABSTRACT

A hanger is disclosed comprising spaced apart hook means that are joined by separated connecting means defining an access area or alley therebetween. One of the connecting means has an opening to provide an entrance and exit to the access area and thereby to at least one of the spaced apart hook means.

5 Claims, 6 Drawing Figures

U.S. Patent  Jan. 23, 1979  4,135,693
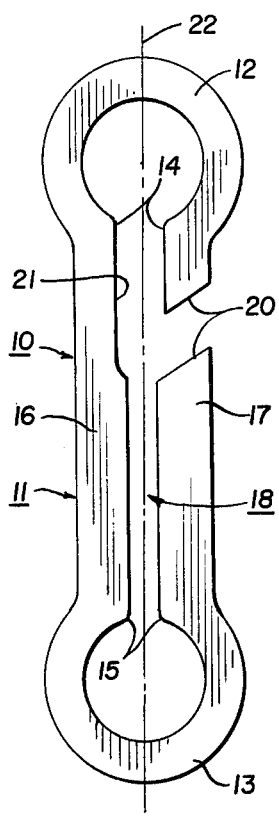
Fig. 1
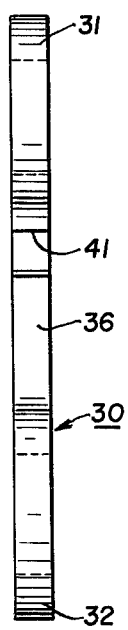
Fig. 2
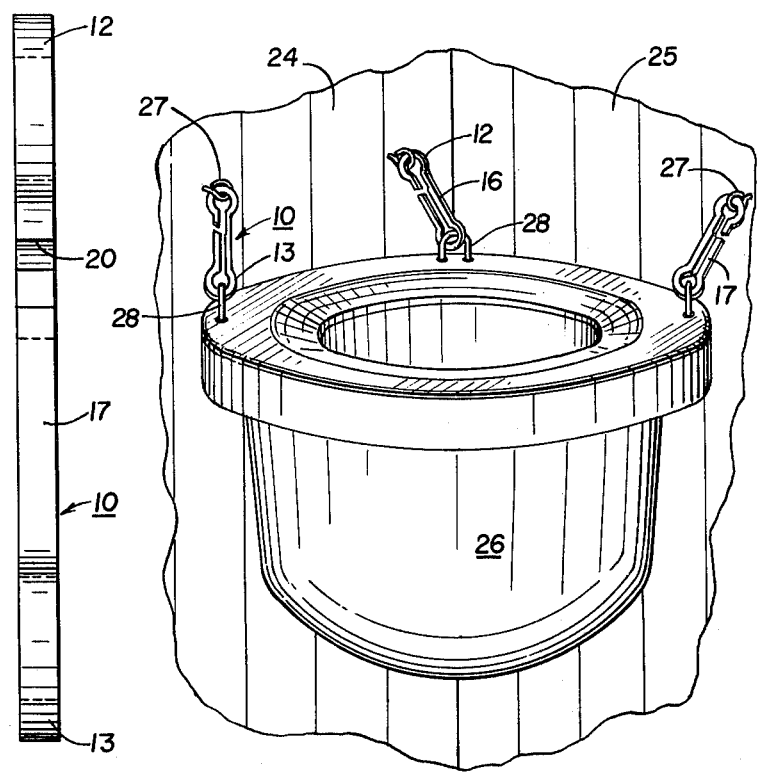
Fig. 3
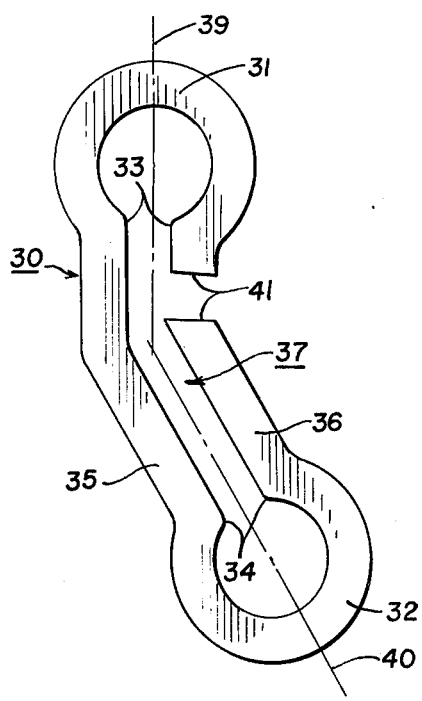
Fig. 4
Fig. 5
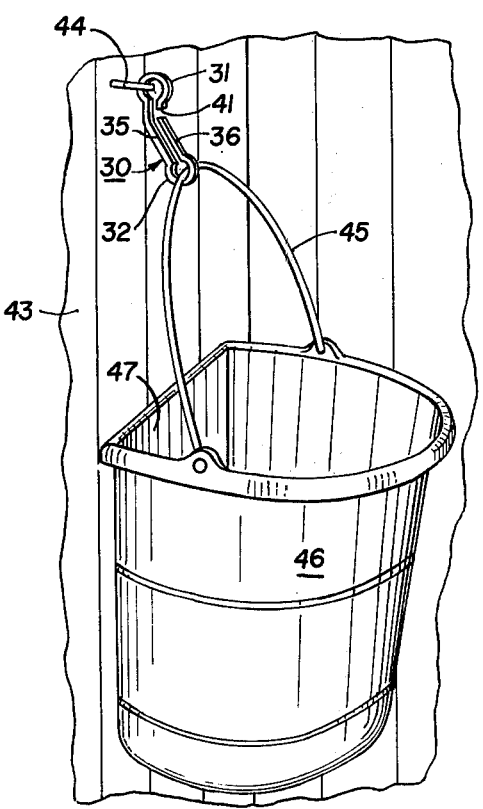
Fig. 6

4,135,693

DOUBLE HOOK HANGER

BACKGROUND OF THE INVENTION

Hangers are commonly used in many applications for supporting various articles. Among the desirable attributes of a hanger is its ability to be connected and disconnected readily with respect to an article to be supported with little or no difficulty. At the same time, another desirable attribute is the ability of a hanger to resist accidental dislodgement or disconnection, either with respect to a stationary support to which the hanger is joined or with respect to the article which the hanger carries. To a significant extent, these desirable attributes are counterproductive. If a hanger is easy to connect and disconnect at will, it is apt to be easy to connect and disconnect accidentally. Conversely, if a hanger is designed to resist accidental disconnection, it is usually connected to a support or an article to be carried only with some difficulty.

These problems are peculiarly accentuated in the case of a hanger designed for supporting feed buckets, tub, and the like for animals. As an animal feeds, particularly a horse, it is apt to push and move a bucket or tub excessively with its nose. If the tube is not fairly secured by a hanger, the tub can be easily dislodged. In a stall where many horses are to be fed, it would be highly desirable to have a hanger which is easily connected for use and which steadfastly resists disconnection.

SUMMARY OF THE INVENTION

The principal object of the present invention is to provide a hanger which can be installed or connected to an article to be supported virtually instantly, and yet by reason of its structure is difficult to dislodge or dislocate. Other objects include the provision of a hanger which is inexpensive to manufacture but which is simple and strong in structure.

In general, in one form, the hanger comprises spaced apart hook means or members which are enclosed except for connecting, separated strip means or members. The separated strip means define therebetween an access area or alley which leads to at least one of the spaced apart hook members. One strip member has an opening or gap defining an entrance as well as an exit to and from the access alley, so that an article may be placed in or withdrawn from the access alley through the gap and thereby placed in or withdrawn from a hook member.

Preferably, the opening in one of the connecting members is on a bias to the general longitudinal disposition of the connecting member, and the access area to at least one of the spaced apart hook members is enlarged widthwise with respect to the remaining length of the access alley. The hanger may be either straight or bent to one side.

BRIEF DESCRIPTION OF THE DRAWING

In the accompanying drawing:

FIG. 1 is a front elevational view of one form of the present hanger;

FIG. 2 is a right hand end view of FIG. 1;

FIG. 3 is a perspective view of hangers of FIGS. 1 and 2 supporting a feed tub in a stall;

FIG. 4 is a front elevational view of another form of the present hanger;

FIG. 5 is a right hand end view of FIG. 4; and

FIG. 6 is a perspective view of the hanger of FIGS. 4 and 5 supporting a feed bucket in a stall.

DESCRIPTION OF THE PREFERRED EMBODIMENTS

The present hanger may be made from a variety of materials including synthetic resins and plastics, such as fiber-reinforced resins and plastics, but is is preferably made from metal for greater strength and endurance. The hanger may be fabricated by a conventional stamping operation or fashioned from rolled wire.

Referring to the embodiments of FIGS. 1 through 3, this form of hanger may be used readily to connect and disconnect cords, ropes and the like extending across stalls for animals; or it may be used with like companion hangers to support a feed tub or bucket.

In the form illustrated, the hanger generally represented at 10 includes a one-piece continuous strip generally represented at 11 fashioned to form two exposed hook means or members 12 and 13 which in the illustrated embodiment take the form of circular eyelets.

Hook members 12 and 13 are enclosed except for gaps 14 and 15, respectively, in their circular configurations, where the hook members merge with separated, substantially parallel strip members 16 and 17 which thereby connect the hook members and form one integral hanger body. Strip members 16 and 17 are spaced to define therebetween an access area or alley generally indicated at 18, the area communicating with the interiors of hook members 12 and 13.

In the embodiment illustrated, strip member 17 has a break or gap 20 to define an entrance and exit to access alley 18, and thus to either hook member 12 or 13, for an article to be supported, such as a bail of a bucket or tub. Either strip member 16 or 17 may have a break such as is indicated at 20. In order to make accidental disconnection more difficult without simultaneously making a quick connection more difficult, break or gap 20 may be placed on a bias with respect to the longitudinal disposition of strip member 17 as illustrated in FIG. 1.

As an aid to making fast connection and disconnection, access alley 18 may be enlarged widthwise along a length leading to a hook member. In FIG. 1, for example, the width of strip member 16 is reduced as at 21 to provide a wider access alley at that portion of member 16 leading to hook member 12. The centers of the circular hook members 12 and 13 lie on a straight line that is at least substantially parallel to the central longitudinal axis of hanger 10. In the embodiment of FIGS. 1 and 2, the centers of hook members 12 and 13 lie on a straight line that coincides with the central longitudinal axis of the hanger, represented by the imaginary line 22.

FIG. 3 illustrates one manner by which the hanger of FIGS. 1 and 2 may be used. Intersecting vertical walls 24 and 25 of a stable, stall or the like, support a feed tub 26 by means of three of the hangers illustrated by FIGS. 1 and 2. One hanger is placed at or near the intersection of walls 24 and 25, and the remaining two hangers are spaced along the walls from the center hanger at about the same vertical height. In each case one hook member, such as hook member 12 engages an eyelet screw 27 fixed into a wall; and the other hook member, such as hook member 13, engages an inverted U-shaped fastener 28 fixed into a rim of feed tub 26. The hangers 10 engage the eyelet screws 27 and fasteners 28 by passing them in turn through gap 20 in strip member 17 and then through access alley 18 to a hook member. It will be noted that the wider portion of alley 18 is preferably used to pass an eyelet screw 27. This leaves the narrower portion of alley 18 to contain more restrictively a fastener 28.

FIGS. 4, 5 and 6 illustrate another embodiment of the hanger in which the means which connect the spaced apart hook means has a common bend in the same direction intermediate its length. In the form illustrated, a hanger generally represented at 30 includes a one piece continuous strip fashioned to form two opposed hook means or members 31 and 32 which in the illustrated embodiment comprises circular eyelets. Hook members 31 and 32 are enclosed except for gaps 33 and 34, respectively, in their circular configurations, where the hook members merge with separated, substantially parallel strip members 35 and 36 which thereby connect the hook members and form one integral hanger body. Strip members 35 and 36 are spaced to define therebetween an access area or alley generally represented at 37 which communicates with the interiors of hook members 31 and 32.

Strip members 35 and 36 have a common bend in the same direction to the right as viewed in FIG. 4 intermediate their lengths. In this instance, the centers of the circular hook members 31 and 32 lie on imaginary straight lines 39 and 40 which substantially parallel the longitudinal extent of their respective portions of the hanger and intersect each other as illustrated in FIG. 4.

Strip member 36 has a break or gap 41 to define an entrance and exit to access alley 37 and thus to either hook member 31 or 32. Preferably, but not necessarily, break 41 occurs at or near the bend of strip member 36. Either strip member 35 or 36 may have such a break. As in the embodiment of FIGS. 1 and 2, access alley 37 may be similarly enlarged widthwise throughout one length leading to a hook member.

FIG. 6 illustrates one manner by which the hanger of FIGS. 4 and 5 may be used. In particular, a bent hanger of this embodiment may be employed to hold a flat-sided bucket in a stable position in which the flat side is completely butted against a supporting wall. In FIG. 6 a wall 43 has a fixed eyelet screw 44 engaging hook member 31 of hanger 30, while a bail 45 of a flat-sided bucket 46 engages the other hook member 32. As illustrated, preferably the shorter length formed by the bend is placed above the longer length of the bend to dispose the longer length away from wall 43. This places bail 45 similarly away from wall 43, so that a flat side 47 of bucket 46 butts more fully against the wall and is less likely to pivot or sway about its point of suspension in hanger 30.

Although the foregoing describes several embodiments of the present invention, it is understood that the invention may be practiced in still other forms within the scope of the following claims.

I claim:

1. A one-piece hanger comprising an integral strip shaped into a configuration including opposed circular ends of substantially equal diameter defining hook means, said ends being connected by separated, substantially parallel lengths of said strip, said lengths being separated a substantially equal distance from one circular end to the other, said distance being less than the diameter of a circular end and forming an access area between said lengths and communicating with at least one of said circular ends, the terminals of said integral strip being spaced apart to form a permanently open gap lying between said opposed circular ends and forming a continuation of one of said connecting lengths of the strip, said gap defining an entrance and exit to said access area, a section of one of said lengths adjacent a circular end having a smaller width than a corresponding section of the other parallel length adjacent the same circular end to provide an enlarged access area between said corresponding sections, whereby an article to be supported by the hanger may be placed in or withdrawn from said access alley and thereby placed in or withdrawn from a circular end, and said permanently open gap being relatively small to prevent accidental release of such article.

2. The hanger of claim 1 in which the centers of said opposed circular ends lie on straight lines which substantially parallel the longitudinal extent of their respective ends of the hanger and intersect each other to form an obtuse angle.

3. The one-piece hanger of claim 1 in which said substantially parallel lengths have a common bend in the same directing intermediate their lengths.

4. The one-piece hanger of claim 3 in which said gap of said one connecting length occurs substantially at the bend of that length.

5. The one-piece hanger of claim 1 in which a section of one of said lengths adjacent a circular end has a smaller width than a corresponding section of the other parallel length adjacent the same circular end to provide an enlarged access area between said corresponding sections.

* * * * *